April 14, 1942.  E. H. GATES  2,279,735
VEGETATION-BEARING DISPLAY SURFACE AND SYSTEM
Filed May 27, 1938
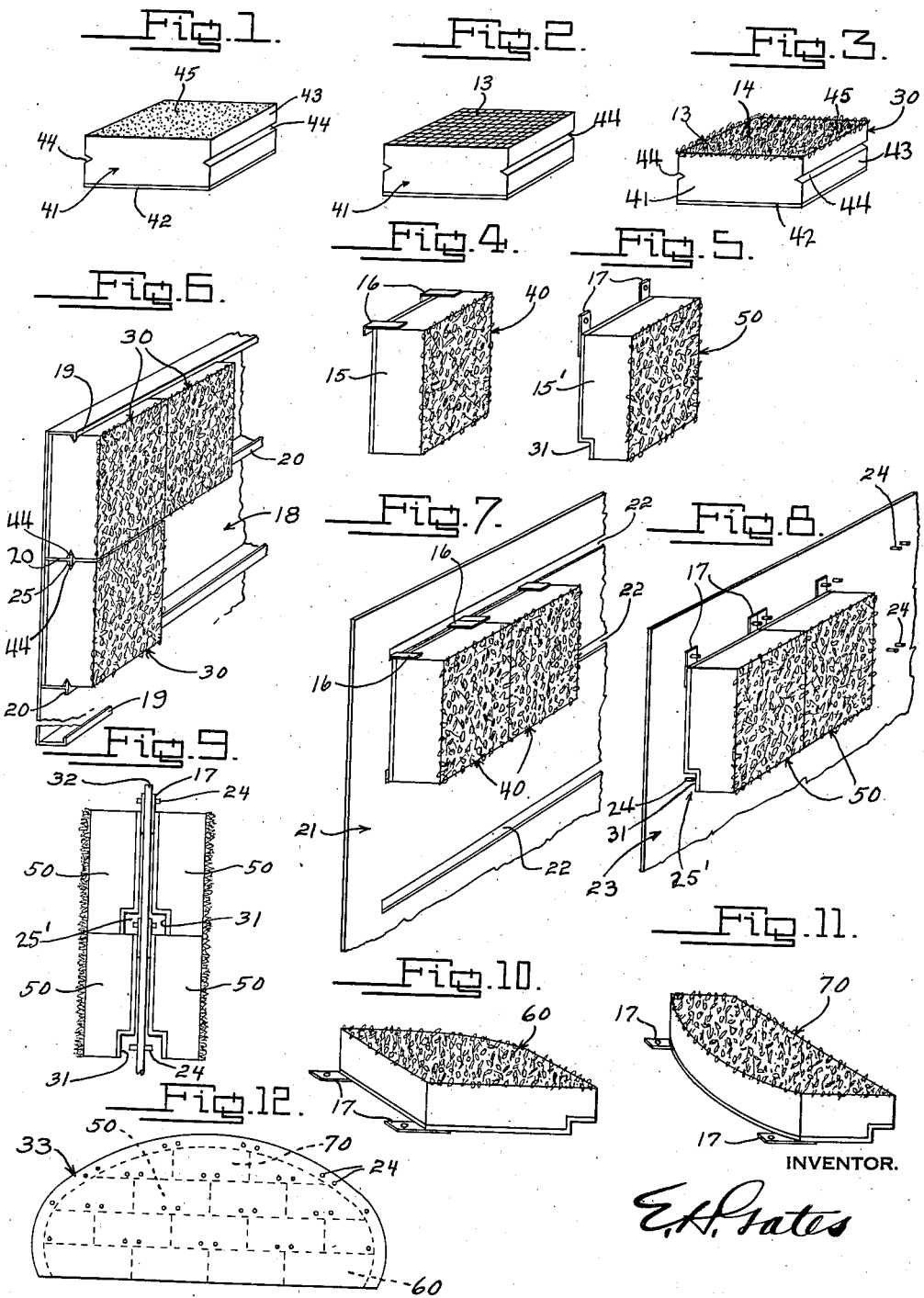
INVENTOR.
E. H. Gates Patented Apr. 14, 1942

2,279,735

UNITED STATES PATENT OFFICE 2,279,735

VEGETATION-BEARING DISPLAY SURFACE AND SYSTEM

Elmer Hovenden Gates, Arlington, Va., assignor to Noel Wright Gates, Arlington, Va.

Application May 27, 1938, Serial No. 210,498

6 Claims. (Cl. 47—33)

This invention relates to vegetation bearing architectonic structures presenting plant-bearing facing units, and more particularly to upwardly projecting mounting surfaces suitable for indoor and outdoor advertising displays presenting surfaces carpeted with growing flowers and vegetation. It further comprehends the related method of making and assembling such display structures, particularly wherein economy of structure is a factor and wherein ability to distribute unusual loads is not essential. An object of this invention is to afford a vegetation covered display structure that may be rapidly and economically erected and dismantled. Another object is to provide such a structure that may be rapidly repatterned in a variety of designs and shapes. A further object is to provide a method for making these novel structures and their tegular plant-facing units. Equally important objects will more plainly appear from the detailed explanation and drawing presented herewith in exemplification but not in limitation of the present invention.

Like reference characters designate like parts in the drawing which represents diagrammatically in:

Fig. 1. A perspective view of a compost-filled facing container.

Fig. 2. A perspective view of the container shown in Fig. 1, and provided with a reticular cover.

Fig. 3. A perspective view of a vegetation bearing facing unit in its propagating position.

Fig. 4. A perspective view in a display position of a modification of the facing unit shown in Fig. 3.

Fig. 5. A perspective view in a display position of a modification of the facing unit shown in Fig. 4.

Fig. 6. A perspective view of an upwardly projecting mounting surface adapted to detachably receive a plurality of the facing units shown in Fig. 3.

Fig. 7. A perspective view of an upwardly projecting mounting surface adapted to detachably receive a plurality of the facing units as shown in Fig. 4.

Fig. 8. An upwardly projecting mounting surface adapted to detachably receive a plurality of the facing units shown in Fig. 5.

Fig. 9. A vertical cross section of an upwardly projecting double mounting surface similar to the single mounting surface shown in Fig. 8.

Figs. 10 and 11. Facing units similar to that shown in Fig. 5 but modified in shape.

Fig. 12. A mounting surface similar to that shown in Figs. 8 and 9 but modified in shape.

In Fig. 1 is shown a rectangular container or tray 41, comprising a base member 42 and side members 43. Any two opposite side members 43 are preferably grooved as shown at 44. The tray member 41 is preferably filled with a synthetic plant nourishing and conditioning compost 45 which is subsequently provided with planted seeds, spores, cultures or cuttings. A reticular cover 13 is then preferably attached to the tray 41 as shown in Figure 2 and subsequently the vegetation 14 is rooted in the compost 45 and grows through and carpets the reticular cover 13 to form a vegetation bearing facing unit 30 as shown in Fig. 3.

Fig. 4 shows a modified form of the facing unit shown in Fig. 3 having inwardly and downwardly projecting attaching strips 16 preferably fixed to the upper rear corners of the unit 40 as shown in Fig. 4.

Fig. 5 shows modified attaching means 17 in the form of upwardly projecting eyelet strips preferably attached to the upper rear corners of the facing unit 50. The facing unit 50 is provided with a recess 31 along the lower inner edge thereof to permit the tegular arrangement of adjacent units thereto as shown in Figs. 8 and 9.

Fig. 6 shows a perspective view of a portion of an upwardly projecting mounting surface 18 provided with upper and lower channel members 19, and intermediate I-beam members 20 adapted to slidably and removably receive and support a plurality of the facing units 30.

Fig. 7 shows a perspective view of a portion of an upwardly projecting mounting surface 21 provided with a series of horizontal slots 22 adapted to slidably and detachably receive a plurality of facing units 40 as shown in Fig. 4.

Fig. 8 shows a perspective view of a portion of an upwardly projecting mounting surface 23 provided with outwardly projecting supporting rods 24 adapted to engage the eyelet strips 17 and to thereby detachably receive a plurality of facing units 50; the recess 31 in the facing unit 50 permitting the engagement of adjacent facing units 50.

Fig. 9 shows a vertical cross sectional view of a portion of an upwardly projecting mounting surface 32 similar to the surface 23 shown in Fig. 8 but adapted to receive facing units 50 on both sides of the mounting surface 32. The facing unit 50 may also be shaped to combine in its periphery a portion of an arc or curve as shown in Figs. 10 and 11, thereby permitting display surface outlines containing arcs or curves as shown in the diagram of the mounting surface 33, in Fig. 12, wherein a lower curve may be formed by units as shown at 60, upper curves as shown at 70 and interior surfaces covered by facing units as shown at 50.

In operation the propagation tray or container 41 may be formed of a base member 42 to which are attached side members 43, any opposite two of which are preferably grooved as shown at 44 in Fig. 1. The tray or container is preferably approximately 10" square but is not limited in dimensions for the purpose of this invention. While it is preferably made of cypress or redwood, it may also be made of corrosion-resisting sheet material such as alloyed steel or other sheet metals, plastic sheeting, fibre board and the like. If made of metal or plastic, the entire tray or container 41 may be stamped out and perforated in one piece. The tray 41 may next be filled to its upper surface, with preferably, a synthetic plant nourishing compost comprising a moisture retaining medium such as mineral wool, an organic filler such as peat moss, a surface binder such as loam or soil, and additional chemical fertilizers, plant nutrients and conditioners such as are already well known. The compost 45 shown in Fig. 1 may then be seeded or provided with spores, cultures or cuttings. The container tray 41 may be then covered with a recticular cover 13 attached to the edges of the tray 41 as shown in Fig. 2, so that vegetation 14 will root in the compost 45 and grow through and carpet the reticular cover 13 of the facing unit 30 as shown in Figs. 1, 2 and 3. In a like manner the facing units shown in Figs. 4, 5, 10 and 11 may also be provided with a carpet of growing vegetation on the outer face of each of the facing units 40, 50, 60 and 70.

For the facing units 30, an upwardly projecting mounting surface may be provided, as shown at 18 in Fig. 6. This surface may take the form of a screen or a sign or a billboard or a background for a store window decoration or display. To the surface 18 are attached preferably in a horizontal series, a plurality of parallel channel or I-beams, so that they will project outwardly from the display surface 18, as shown in Fig. 6, in such a manner that they are adapted to receive and suspend the facing units 30 in tegular arrangement thereon, by means of the grooves 44 in the facing units 30 which slidably engage the channel and I-beam members 19 and 20 as shown in Fig. 6. When a series of facing units 30 are thus inserted and suspended upon the surface 18, the adjacent grooves 44 form a continuous aperture or channel 25, as shown in Fig. 6, through which water and plant nutrients may be injected or supplied to the facing units 30 after they have been assembled in their upwardly projecting display position, as shown in Fig. 6. The usual perforations suitably spaced in the units 30 permit the seepage of the fluids from the channels 25 and 25' into the units 30 and 50 respectively. The units 40, 60, and 70 may obviously have fluids injected through the reticular face 13, or through the usual perforations provided in the base members 42 thereof.

The mounting surface 18 is particularly adapted to outdoor displays of medium size, such as temporary screens of vegetation or flowers, or such as medium size advertising displays for highways or boulevards, but is of course, not limited to these specific uses.

For the facing units 40, an upwardly projecting mounting surface 21, such as shown in Fig. 7 may take the form of a panel or a screen, or a billboard or signboard, preferably provided with a series of parallel horizontal slots 22, which are adapted to slidably receive and engage the attaching or suspending strips 16, of the facing units 40 as shown in Fig. 7. The mounting surface 21 as shown in Fig. 7 is particularly adapted to the smaller size of outdoor displays or the larger type of indoor store window displays, but is of course, not limited to these uses.

For the facing units 50, an upwardly projecting mounting surface 23 may be provided as shown in Fig. 8. This mounting surface may preferably take the form of a smaller panel or screen for use in the smaller type of indoor displays, such as the smaller type of store window. Mounting surface 23 is provided with outwardly projecting supporting rods 24 which engage the eyelet strips 17 of the facing units 50. In the tegular or tile-like arrangement of units 50, shown in Fig. 8, the recess 31 will form an aperture or channel 25' which may be used for irrigation or the injection of plant nutrients in the manner previously described for the mounting surface 18, as shown in Fig. 6.

A double surface of vegetation or greenery may be formed by erecting back to back, two of the structures shown at 18 in Fig. 6, or at 21 in Fig. 7. A double-surface wall of vegetation may be formed from the mounting panel 23 as shown at 32 in Fig. 9. With the modified shapes provided by facing units such as are exemplified in 60 and 70 in Figs. 10 and 11, a wide variety of outline and pattern may be obtained for store window displays and other decorative display, by means of the mounting surface or panel shown in Fig. 12, which affords a vegetation or flower covered background that may be rapidly and economically assembled in an interior, such as a store window, store counter, or a veranda or sun-porch. The various types of facing units on their mounting surfaces or panels herein described may be used singly or in combination, either as decorative advertising displays or incorporated in architectonic compounds as a beautifying or heat-insulating medium.

The reticular material used to form the covers 13 may be preferably of corrosion resisting open wire mesh fabric or sheet material. Other forms of reticular material may be expanded metal lath or sheets, openly perforated sheeting of various materials and similar reticular sheeting that is sufficiently corrosion resisting to withstand a year's usage and to be chemically unharmful to plant life.

A wide variety of vegetation is available for use in the vegetation-bearing facing units described herein. Those particularly desirable comprise many varieties of rock plants that may be favorably grown in conditions of reduced sun light and moisture. The compost can be readily selected to best serve the conditions of use for many varieties well known in horticulture. A synthetic soil substitute or compost may be made with any of the mineral fibres used for insulating purposes, such as aerated or puffed micaceous material such as vermiculite, all of which may take the place of the relatively inert mineral portion of natural earth. Mineral wool preferably used in this invention will absorb approximately 90% of its volume in water and retain it over a protracted period of time and in this invention takes the place of ground moisture. To this compost may be added humus or peat moss in any standard or modified form, together with the chemical nutrients required for plant growth. In addition there may be mixed with or injected into the compost any of the conditioners of organic growth either chemical (unorganic or organic) bacteriological, symbiotic, enzymatic, or harmonic.

The mounting surfaces 18, 21 or 23 may be used in horizontal position in a greenhouse or a garden so that facing units 30, 40, 50, 60 and 70 may be assembled thereon and the vegetation 14 propagated therein in an horizontal position whereafter the entire structure may be shipped to the display site and subsequently erected as a unit in its upwardly projecting display position.

In the specification and claims the following terms used therein are intended to be defined as follows:

Architectonic: pertaining to the art of landscaping structure as well as to buildings, but distinguished from the art of plant culture.

Compound: a structural assembly of a plurality of structural units.

Reticular material: meshed or perforated sheet material or fabric, expanded metal lath or sheets, wire netting or wire fabric sheets, meshed chain mail fabric.

The word suspended as used herein is intended to mean suspended upon, as a picture is suspended upon a wall, and is intended to connote the added positioning and supporting action exerted from behind and below by the panel upon which the facing units are suspended.

While the foregoing specification and drawing set forth preferred exemplifications of the present invention it is intended to include all variations and modifications within the spirit and scope of the appended claims.

I claim:

1. A vegetation-bearing panel structure comprising a combination, upwardly projecting display mounting surface having detached and slidably suspended thereupon in tegular arrangement, a series of vegetation supporting contiguous facing units provided with reticular faces covered with growing vegetation and capable of presenting an unbroken surface of vegetation over said mounting surface, said units being recessed at their lower inner edge to form thereby an irrigating channel in said series of facing units.

2. A vegetation-bearing panel structure comprising a combination, upwardly projecting display mounting surface having detached and slidably suspended thereupon in tegular arrangement, a series of vegetation supporting contiguous facing units provided with reticular faces covered with growing vegetation and capable of presenting an unbroken surface of vegetation over said mounting surface, said display surface being provided with a series of outwardly projecting parallel channel forming members adapted to slidably engage and suspend said facing units upon said panel, said facing units having on opposite sides thereof a medial longitudinal groove adapted to slidably engage said channel forming member and to form therewith an irrigating channel in said series of facing units.

3. In combination, a structure providing an upwardly projecting substantially plane mounting surface, a series of vegetation supporting contiguous facing units having reticular covers, attaching means secured only to said surface for detachably suspending said units on said surface in tegular arrangement and in substantially parallel relationship to said mounting surface, said units having vegetation growing therein and through said covers whereby said units may provide a substantially unbroken surface of vegetation over said mounting surface.

4. The combination set forth in claim 3 wherein said units are slidably and removably suspended upon said mounting surface.

5. The combination set forth in claim 3 wherein said units contain a compost comprising a moisture retaining medium having substantially the characteristics of mineral wool and being capable of absorbing an amount of moisture equal to approximately 90% of the volume of said medium, said compost having said vegetation rooted therein.

6. A vegetation bearing panel structure comprising in combination an upwardly projecting display mounting surface having detachably suspended thereupon in tegular arrangement a series of vegetation supporting contiguous facing units, said facing units comprising a tray like container filled with a plant nourishing compost embodying a moisture retaining medium capable of absorbing approximately 90% of its volume in moisture, a reticular cover holding said compost in said tray said compost being provided with vegetation rooted therein and going through and carpeting said cover so that said units may be capable of presenting an unbroken surface of vegetation over said surface, said units being recessed at their lower inner edge to form thereby an irrigating channel in said series.

ELMER HOVENDEN GATES.